Nov. 6, 1951  E. W. ZINGSHEIM  2,574,004
BALKING RING CLUTCH
Filed June 23, 1949  2 SHEETS—SHEET 1
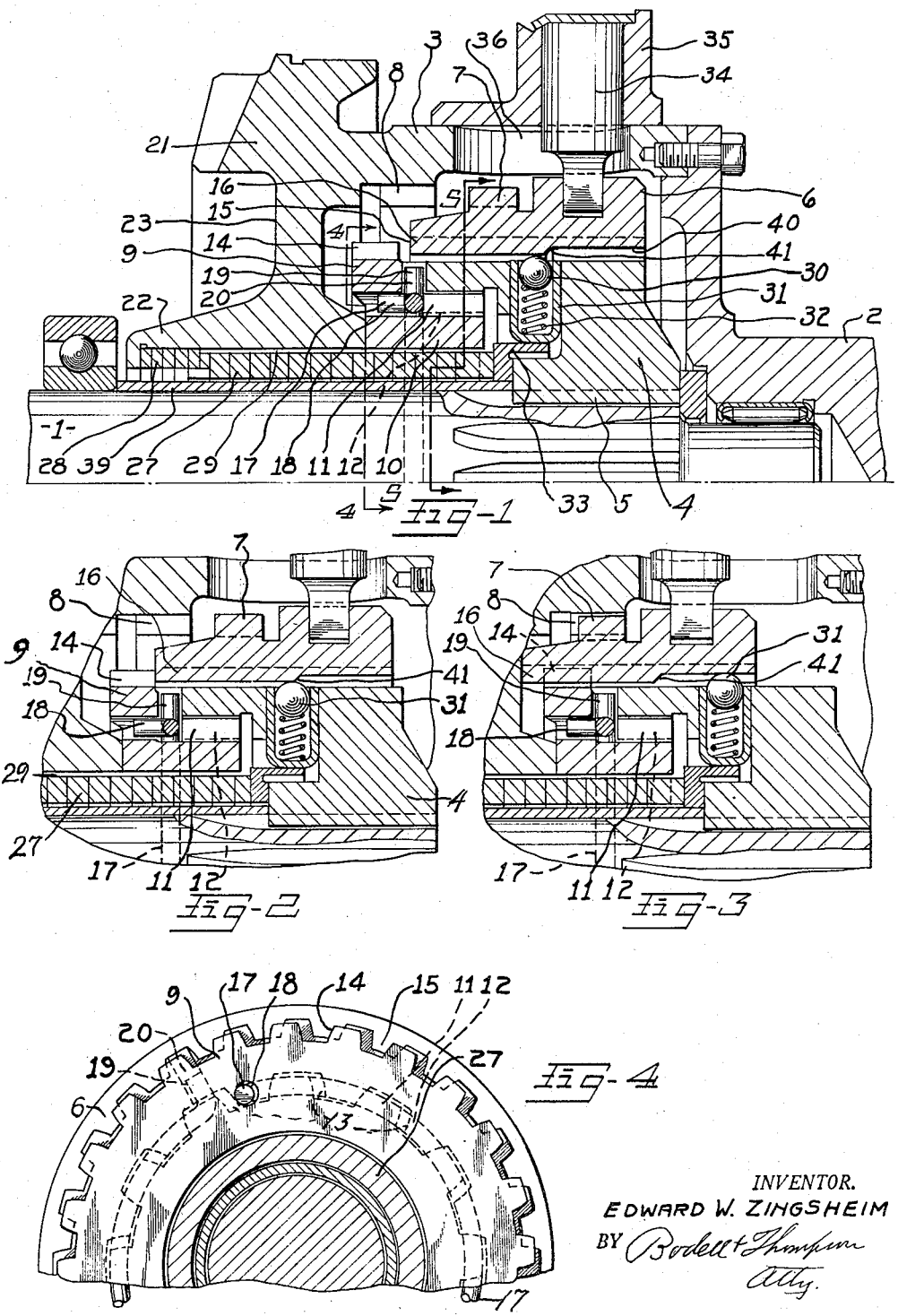
INVENTOR.
EDWARD W. ZINGSHEIM
BY Bodell & Thompson
Atty.

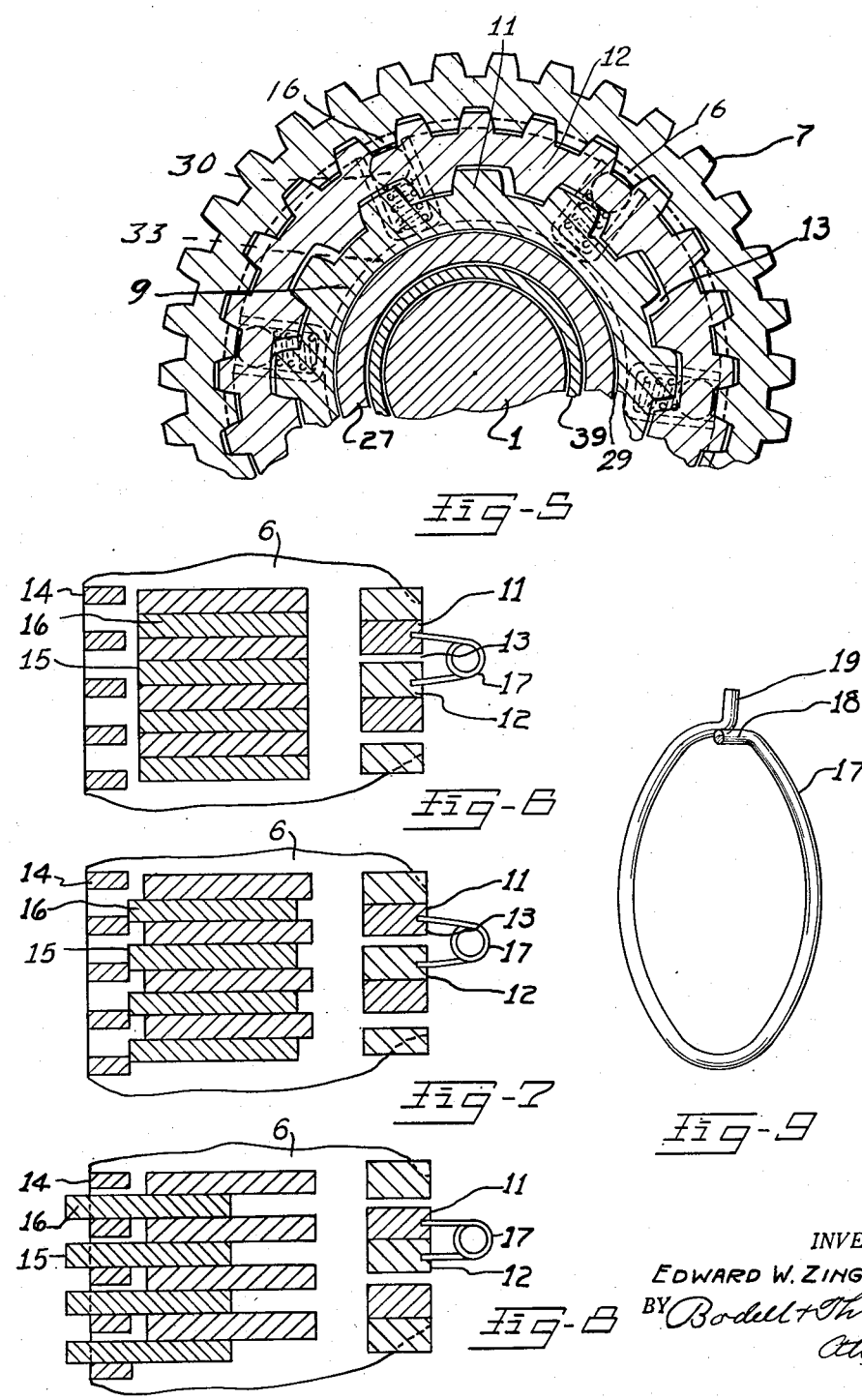

Patented Nov. 6, 1951

2,574,004

UNITED STATES PATENT OFFICE 2,574,004

BALKING RING CLUTCH

Edward W. Zingsheim, Toledo, Ohio, assignor to Dana Corporation, Toledo, Ohio, a corporation of Virginia Application June 23, 1949, Serial No. 100,776

5 Claims. (Cl. 192—53)

This invention relates to balking ring clutches, and has for its object means operated by the shiftable member or collar of one clutch section to relieve the balking ring, for the most part, of forces tending to bind its blocking teeth after unblocking and when the clutch jaws are engaged, against the intermeshing blocking teeth of the shift member or collar, all so that there are no forces acting in conjunction to bind the intermeshing blocking teeth or shoulders on each other during shifting of the clutch out of engaged position.

It is well known that in balking ring clutches the intermeshing balking teeth or shoulders and the intermeshing clutch teeth or jaws are liable to become wedged or jammed against disengagement on the drive and coast sides thereof. By this invention, the liability of wedging is eliminated by freeing the balking ring so that it is free to rock or center itself when the clutch teeth, or jaws, are intermeshed.

Another object is a friction clutch construction and arrangement for shifting the balking ring into and out of locking position, the friction clutch being controlled by the relative speeds of the driving and driven clutch sections and shafts to be clutched together. It is this friction clutch that is disengaged to free the balking rings when the clutch teeth or jaws are intermeshed.

As is well known, a balking ring clutch embodies a clutch in some form to control the shifting or limited rocking of the balking ring out of blocking position, which is operated or controlled by the differential speeds of driving and driven jaw clutch sections and which shift the balking ring out of blocking position when the speeds cross. The speeds are crossed by deceleration of the engine and the driving clutch section until the driven clutch over-runs under the momentum of the vehicle in which the clutch is installed, or by acceleration of the engine. When the clutch is designed for an up shift from a lower gear ratio to a higher ratio or into direct drive, the engine is decelerated to effect the crossing of the speeds. When the clutch is designed for a down shift from a higher gear ratio to a lower through an indirect drive, the engine is accelerated to effect the crossing of the speeds of the drive clutch section and the driven clutch section of the final drive gear or member of the indirect drive.

The invention consists in the novel features and in the combinations and constructions hereinafter set forth and claimed.

In describing this invention, reference is had to the accompanying drawings in which like characters designate corresponding parts in all the views.

Figure 1 is a fragmentary longitudinal axial sectional view of a balking ring clutch embodying this invention, showing the shiftable clutch parts in unclutched position.

Figures 2 and 3 are views, similar to Figure 1, showing the clutch parts as shifted to balking and to fully engaged positions respectively.

Figure 4 is a view on line 4—4, Figure 1.

Figure 5 is a sectional view on line 5—5, Figure 1.

Figures 6, 7 and 8 are diagrammatic views showing the position of the balking teeth or shoulders of the balking ring and of the shift member or collar when the parts are in the positions shown in Figures 1, 2 and 3, respectively.

Figure 9 is a detail view of the springs biasing the balking ring.

The balking ring clutch is shown as embodied in a transmission to connect an engine actuated drive shaft to an axially alined driven shaft in direct drive relation. The transmission also includes an indirect drive from the drive shaft to the driven shaft, as through a hydraulic torque converter, not shown, the pump wheel of which is actuated by the engine shaft.

The balking ring clutch may be embodied in any other situation where balking clutches are used, either where a shift is to be made from a lower gear ratio to a higher, or from a higher ratio to a lower ratio. For brevity's sake, the clutch is here described as a direct drive clutch in which a shift is made from a lower gear ratio (hydraulic torque converter) to a higher direct drive.

1 designates an engine actuated drive shaft, 2 is an axially alined driven shaft having a hollow cylindrical head 3 into which the drive shaft 1 extends. 4 is the driving section of the direct drive clutch, this being keyed at 5 to the drive shaft within the head 3. 6 is a shift member or collar slidably splined on the periphery of the driving section 4 and having clutch jaws or peripheral clutch teeth 7 normally spaced axially from and shiftable into and out of engagement with internal clutch jaws or clutch teeth 8 on the driven shaft 2, or the head 3 thereof, which constitutes the driven section of the direct drive clutch.

9 is the balking ring, this being arranged concentric with the drive section 4 and its shift collar 6, and having a hub 10 extending into an annular recess in one end of the section 4 formed with peripheral teeth 11 which extend between or mesh with internal teeth 12 on the outer wall of the recess, these teeth interfitting with the lost motion at 13 which permits the usual limited rocking movement of the balking ring to shift the balking shoulders into and out of balking or blocking position. The balking ring 9 has balking teeth or shoulders 14 normally arranged in alinement with balking shoulders 15, see Figures 4 and 5, on the shift collar 6, the shoulders 15 being the ends of the internal splines 16 of the shift collar. The splines 16 slide in external splines on the drive section 4 of the direct drive clutch. The balking ring 9 is biased by a spring 17 to normally open the lost motion space 13, Figure 4. The spring consists of a coil having arms 18, 19, at the ends of the coil, one arm 18 extending into a transverse bore 20 in the adjacent portion of the clutch section 4, and the other arm 19 extending into a radial bore in the balking ring 9. The movement of the balking ring out of balking position, this being the rocking movement of the balking ring relative to the clutch section 4 against the action of the spring 17, is effected by a friction clutch for clutching the balking ring 9, or the hub 10 thereof, to the clutch section 4 and to the driven clutch section or head 3. It is here shown as clutching a part 21 rotatable with the driven clutch section, that is the head 3, and virtually a part thereof. The clutch is engaged by the relative rotation of the drive clutch section 4 and the driven section 3, or the discoidal part 21 thereof. It is apparent that when the torsion spring 27 is expanded to clutch the balking ring, that is take up the clearance between the periphery of the spring 27 and the hub 22 and the hub 10 of the balking ring, the balking ring will be turned against the reaction of the spring 17 as the balking ring is being turned from the hub 22 which in turn is being rotated by the over-running action of the driven shaft 2 and the head 3. The over-running movement of this balking ring is practically the same as in any balking ring clutch to move the blocking shoulders of the balking ring out of abutting relation with the shoulders as 15 at the ends of the splines holding the shiftable member 6 from complete shifting in movement.

In the illustrated embodiment of this balking ring clutch, the balking ring is located between the part 21 and the driving clutch section 4. The part 21 is here shown as having a hub 22 arranged concentric with the shaft 1 and abutting at its inner side against the end of the hub 10 of the balking ring 9 and as having a disk or web portion 23 which is connected to the head 3 to rotate as a unit therewith.

The friction clutch is here shown as a cylindrical coiled spring 27 coiled about the shaft 1 but radially spaced therefrom, it being connected at one end, through a releasable friction clutch device or coupling, to the drive section 4, and at its other end to the hub 22 of the part 21 by a friction coupling 28, the clutch spring 27 extending through the bores of the hubs 22 and 10 of the part 21 and the balking ring 9 respectively, there normally being a clearance space at 29 between the periphery of the coils of the spring and the walls of the bores of the hubs 22 and 10. The clearance is taken up by the expansion of the spring 27 during torqueing action thereof under the over-running action of the driven shaft 2 relative to the drive shaft 1 so that the web 23 and its hub 22 and the balking ring is actuated during the over-running action through the clutching engagement of the spring 27 and the bores of the hub 22 and of the hub 10 of the balking ring.

The releasable clutch device connection or coupling between one end of the clutch spring 27 and the driving clutch section 4, as here shown, consists of one or more spring pressed poppet heads 30, each seated in a casing or thimble 31, and a spring 32 between the bottom of the thimble and the poppet head 30 tending to press the poppet outward. The poppet head coacts with the inner longitudinal top face of a spline 16 and thus tends to thrust the thimble 31 radially inward against the peripheral surface of a collar 33 to which the adjacent end of the clutch spring 27 is secured. The thimble or the bottom thereof is, in effect, a releasable clutch member here shown as a friction shoe coacting with the collar 33.

The shift member or collar 6 is shifted by studs 34 carried by a collar 35 shiftable axially of the head 3 the studs extending through lengthwise slots 39 in the head 3 and slidably engaging the side walls of a circumferential groove in the shift member or collar 6. The collar is usually shifted by air power in one direction into engaged position against the action of a throw-out spring. The opening and closing of the air valve is automatic.

The internal splines 16 of the shift-in member or collar 6 are cut away, or formed with a clearance at 40 with a cam surface at 41 between the high and low points of the spline. When the shift member or collar 6 is shifted to balk position, Figure 2, the poppet 30 is on the high level of the cam surface 41, and causing the thimble 31 to frictionally clutch the collar 33 and while this is occurring, the spring 27 is expanded and clutches the hubs 22 and 10 under the over-running of the driven shaft and the head 3 effecting the synchronizing or crossing of the speeds of the shafts 1 and 2 when the clutch teeth 7 begin to interlock with the clutch teeth 8, the poppet 30 rides down the cam 41 into the clearance 40, thus relieving the pressure on the poppet holder or thimble 31, so that the frictional contact between the thimble 31 and the collar 33 is released, and the coiled spring clutch 27 releases its frictional engagement with the bore of the hub 22 of the discoidal part 21 and the hub 10 of the balking ring 9. When the shift member or collar 6 is shifted to disengage the direct drive clutch, as to the right, the poppet 30 will ride up the cam 41 and again establish the friction on the collar 33 and the balking ring 9 will be again rocked to balking position by the spring 17 again establishing a lost motion at 13 for the next shifting-in operation of the clutch member or collar 6. The cam 41 is so located as to release the poppet 30 and hence release the balking ring of the over-running action approximately when the speeds are synchronized and hence the clutch teeth 7 and 8 are alined.

The general shifting-in operation of balking ring clutches of this type is as follows: When the speed through the indirect drive, or the torque converter, reaches a predetermined MPR, a governor switch operated by the driven shaft 2 moves into closed position and this switch is in series with a second open switch which may be closed by the accelerator pedal by releasing the accelerator pedal so as to close the throttle valve of the engine and hence, decelerate the engine. The closing of the circuit by these two switches operates an electrical device, as a solenoid, which opens a valve in the air line to a cylinder to actuate a piston therein to move the shift member or collar 6 toward clutch engaging position from the position shown in Figures 1 and 5 to the position shown in Figures 3 and 8, or moving the clutch member or collar 6 to balked position wherein the balking shoulders 15 on the spline 16 abut against the ends of the shoulders 14 of the balking ring 9. In the balking clutch of this invention, the coiled spring clutch 27 being anchored by the friction coupling 28 to the hub 22 of the part 21, and by the clutching contact between the thimble or shoe 31 and the collar 33, expands to take up the clearance 29 between the clutch spring 27 and the bores of the hub 22 and of the hub 19 of the balking ring 9. As the engine decelerates under the closed throttle, the driven shaft 2 and the driven clutch section or head 3 rotates faster than the decelerating shaft 1 and crosses the speeds of the shaft 1 and drive section 4. The coiled spring clutch 27 then, during the faster or over-running of the driven section 3, rotates the balking ring 9 faster than the shaft 1, or the drive section 4, so that the balking ring is shifted from the position shown in Figure 5 to that shown in Figure 8 through the position shown in Figures 6 and 7, so that the splines 16 are alined with the spaces between the balking shoulders 14 of the balking ring 9, and the lost motion at 13 is taken up. In other words, the balking shoulders 14 are moved to unblocking position so that the shifting force applied to the shift member or collar 6 is free to act, and the clutch teeth 7 are moved into intermeshing relation to the clutch teeth 8 when the speeds cross or synchronize.

Owing to the fact that the balking ring 9 is free of any action tending to turn it when the direct drive clutch is engaged, all possibility of binding between the intermeshed balking shoulders 14 and splines 16 of the shift member, or collar 6, and between the engaged clutch teeth 7 and 8 is eliminated.

The friction coupling or anchor 28 is a loaded torsion spring but, insofar as this invention is concerned, it may be unitary with the coiled clutch spring 27. An axial spacing sleeve 39 is located within the coiled clutch spring 27 between a bearing on the shaft 1 and the driving clutch section 4.

In this construction of balking ring clutches, the shift into direct drive can be made with equal facility when the vehicle is coasting as when the vehicle is being driven by the engine. In coasting down hill with the engine throttle closed by the driver, the engine speed decelerates and crosses the speed of the driven shaft 2 of the coasting vehicle. During such coasting, the driven shaft over-runs the drive shaft and hence the clutch spring 27 is expanded into clutching engagement and shifts the balking ring out of balking position so that the clutch teeth 7 of the section 4 are synchronized in their rotation with the clutch teeth 8 and hence, the direct drive can be completed when coasting.

Although the invention is, as before stated for brevity's sake, shown as embodied in a clutch in which a shift is made from a lower to a higher gear ratio upon deceleration of the engine, it may be embodied in a clutch where a shift is made through a balking ring clutch from a higher ratio to a lower ratio upon acceleration of the engine.

What I claim is:

1. A balking ring clutch construction which comprises complemental drive and driven sections, the drive section comprising an axially shiftable member and the driven section being stationary insofar as axial shifting is concerned, the shiftable member having clutch teeth shiftable with said member into and out of intermeshing engagement with complemental clutch teeth on the driven section, and also having blocking teeth, a balking ring rotatable with the drive section and having a limited rocking movement relative thereto, the balking ring having blocking teeth located in the path of movement of the blocking teeth of the shiftable member and shiftable by the rocking movement of the balking ring into and out of blocking position, the blocking teeth of the shiftable member intermeshing with the blocking teeth of the balking ring when the drive and driven sections are engaged, and means biasing the balking ring into position to shift the blocking teeth thereof into blocking position to the blocking teeth on the shiftable member; the balking ring clutch construction being characterized by a clutch spring between the drive and driven sections loaded by overrunning of the driven section when the sections are unclutched, the spring coacting with the balking ring to frictionally grip and rock the balking ring against the action of the biasing means during overrunning of the driven section, the spring being anchored to the driven section, a clutch device carried by the drive section normally anchoring the spring to the drive section when the sections are disengaged, and coacting parts on the clutch device and on the shiftable member to release the clutch device when the shiftable member is shifted to clutch the drive and the driven sections together.

2. A balking ring clutch construction which comprises complemental drive and driven sections, the drive section comprising an axially shiftable member and the driven section being stationary insofar as axial shifting is concerned, the shiftable member having clutch teeth shiftable with said member into and out of intermeshing engagement with complemental clutch teeth on the driven section, and also having blocking teeth, a balking ring rotatable with the drive section and having a limited rocking movement relative thereto, the balking ring having blocking teeth located in the path of movement of the blocking teeth of the shiftable member and shiftable by the rocking movement of the balking ring into and out of blocking position, the blocking teeth of the shiftable member intermeshing with the blocking teeth of the balking ring when the drive and driven sections are engaged, and means biasing the balking ring into position to shift the blocking teeth thereof into blocking position to the blocking teeth on the shiftable member; the balking ring clutch construction being characterized by a clutch spring between the drive and driven sections loaded by overrunning of the driven section when the sections are unclutched, the spring coacting with the balking ring to frictionally grip and rock the balking ring against the action of the biasing means during overrunning of the driven section, the spring being anchored to the driven section, a clutch device carried by the drive section normally anchoring the spring to the drive section when the sections are disengaged, and coacting parts on the clutch device and on the shiftable member to release the clutch device when the shiftable member is shifted to clutch the drive and the driven sections together, the clutch spring comprising a spiral torsion spring extending axially of the clutch sections and of the balking ring through bores therein, the torsion spring when torqued frictionally gripping the bore of the balking ring.

3. A balking ring clutch construction which comprises complemental drive and driven sections, the drive section comprising an axially shiftable member and the driven section being stationary insofar as axial shifting is concerned, the shiftable member having clutch teeth shiftable with said member into and out of intermeshing engagement with complemental clutch teeth on the driven section, and also having blocking teeth, a balking ring rotatable with the drive section and having a limited rocking movement relative thereto, the balking ring having blocking teeth located in the path of movement of blocking teeth of the shiftable member and shiftable by the rocking movement of the balking ring into and out of blocking position, the blocking teeth of the shiftable member intermeshing with the blocking teeth of the balking ring when the drive and driven sections are engaged, and means biasing the balking ring into position to shift the blocking teeth thereof into blocking position to the blocking teeth on the shiftable member; the balking ring clutch construction being characterized by a clutch spring between the drive and driven sections loaded by overrunning of the driven section when the sections are unclutched, the spring coacting with the balking ring to frictionally grip and rock the balking ring against the action of the biasing means during overrunning of the driven section, the spring being anchored to the driven section, a clutch device carried by the drive section normally anchoring the spring to the drive section when the sections are disengaged, and coacting parts on the clutch device and on the shiftable member to release the clutch device when the shiftable member is shifted to clutch the drive and the driven sections together, the clutch spring comprising a spiral torsion spring extending axially of the clutch sections and of the balking ring through bores therein, the torsion spring when torqued frictionally gripping the bore of the balking ring, the clutch device anchoring one end of the clutch spring to the drive section comprising a collar on the torsion spring and a friction shoe carried by the drive section and operated by said coacting parts into and out of contact with the collar.

4. The balking ring clutch set forth in claim 1 in which the shiftable member and the drive section are formed with internal and external slidably interfitting splines, at least one of the splines of the shiftable member being formed with a cut away clearance and an inclined cam step between the clearance and the full portion of the internal spline, the cut away spline being one of said coacting parts, the other of said coacting parts being a radially movable poppet carried by the drive section and extending into said clearance when the clutch is disengaged and riding up the cam into the full portion of the internal spline when the shiftable member interlocks with the driven section.

5. The balking ring clutch set forth in claim 1 in which the shiftable member and the drive section are formed with internal and external slidably interfitting splines, at least one of the splines of the shiftable member being formed with a cut away clearance and an inclined cam step between the clearance and the full portion of the internal spline, the cut away spline being one of said coacting parts, the other of said coacting parts being a radially movable poppet carried by the drive section and extending into said clearance when the clutch is disengaged and riding up the cam into the full portion of the internal spline when the shiftable member interlocks with the driven section, the clutch device also comprising a compression spring between the poppet and the friction shoe.

EDWARD W. ZINGSHEIM.

REFERENCES CITED

The following references are of record in the file of this patent:

UNITED STATES PATENTS

| Number | Name | Date |
|---|---|---|
| 2,022,071 | Barton | Nov. 26, 1935 |
| 2,248,134 | Snow | July 8, 1941 |